Figure 1:
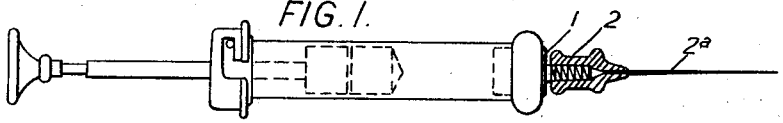

July 8, 1947.  S. J. EVERETT  2,423,762
PIPE JOINT
Filed Nov. 21, 1942  2 Sheets-Sheet 1

Inventor
*Samuel James Everett,*
By
*Robert B. Pearson*
Attorney

July 8, 1947.    S. J. EVERETT    2,423,762
PIPE JOINT
Filed Nov. 21, 1942    2 Sheets-Sheet 2

Inventors
SAMUEL JAMES EVERETT,
By
Robert B. Pearson
Attorney

Patented July 8, 1947

2,423,762

UNITED STATES PATENT OFFICE 2,423,762

PIPE JOINT

Samuel James Everett, Thornton Heath, England

Application November 21, 1942, Serial No. 466,437
In Great Britain May 15, 1942

5 Claims. (Cl. 128—215)

This invention relates to liquid-tight joints as used in hypodermic syringes or similar small surgical or other instruments. The joints with which the invention is concerned are those in which an internally conical member, carrying, for example, a hypodermic needle, is pushed onto an externally conical member constituting, for example, the nozzle of a hypodermic syringe. Thus, the one member is detachably secured to the other and it is highly desirable that the joint, as well as being liquid-tight, shall be rigid and comparatively cheap to manufacture.

According to the invention one of the conical members is formed with a continuous screw thread, adjacent convolutions of which are joined by webs that prevent the liquid from escaping between the two members by running along the helical groove defined by the thread. The other member does not have any complementary thread and its conical surface is preferably quite smooth. Assuming the thread and webs are formed on the externally conical member, which is the preferred arrangement, the smooth internally conical surface is forced into engagement with the screw thread and a slight twist locks the two members in position, the thread, of course, being formed so that its crest conforms to the configuration of the internally conical surface. An advantage of the arrangement, however, is that, if the two members do not happen to be quite complementary, a liquid-tight fit can still be obtained. The internal member, that is the externally conical member, is hard, and the external member may be of fairly hard material such as brass or artificial resin, or it may be of a soft metal such as pewter. In any event, the arrangement is such that there is just sufficient resilience or plasticity to enable the screw thread very slightly to bite into the internally conical surface. The two members can be fitted together an indefinite number of times, either in the same or in different relative positions about their common axis, and still maintain a liquid-tight joint.

The aforesaid webs, which constitute the main feature of the invention, extend outwardly from the root of the thread to the crest, and each such web extends from the flank of one convolution of the thread to the adjacent flank of the next convolution. Accordingly, if a casting method is used, the webs may be formed between two halves of the mould in which the member is formed. Preferably, however, the webs are formed so that they interfere as little as possible with the screwing action of the thread. Therefore, it is advantageous to arrange each web so that it extends obliquely between the two convolutions that it joins. Such webs, which are oblique with respect to the thread, may take various forms. For example, they may be so arranged in series as to constitute a second thread merging into the first at points where the two threads intersect, or the webs may be in the form of parallel rings running round the outside of the internal member and merging into the thread at the points where they intersect it.

Figure 2:
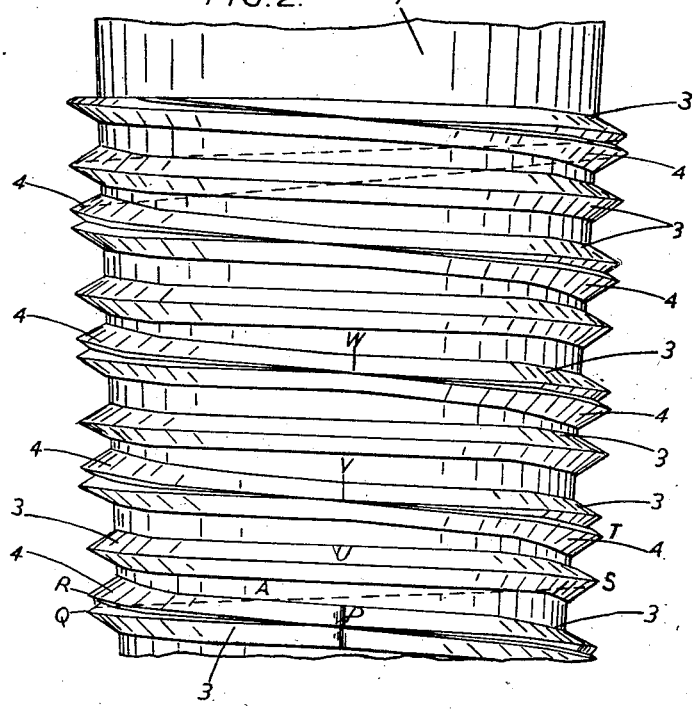
Figure 3:
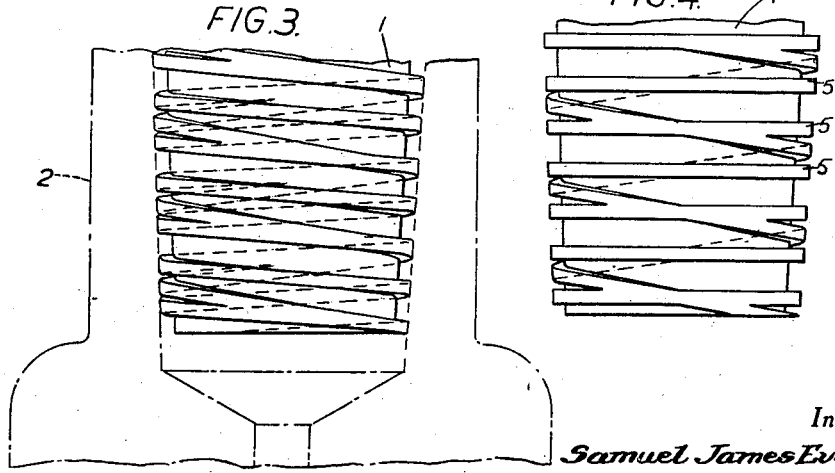
Figure 4:
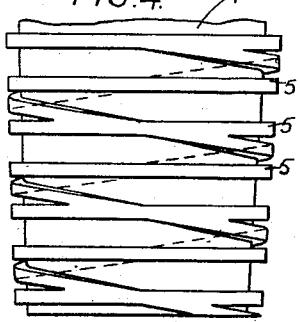
Figure 2A:
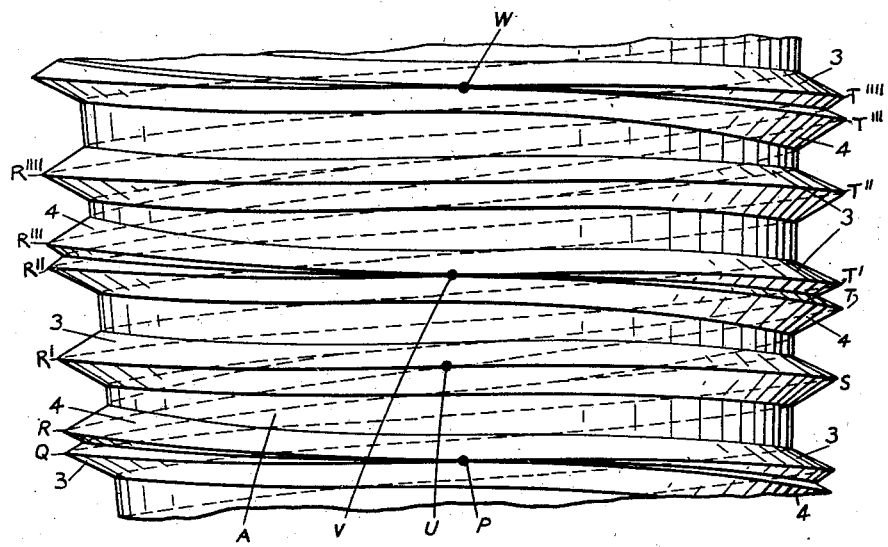
Figure 2B:
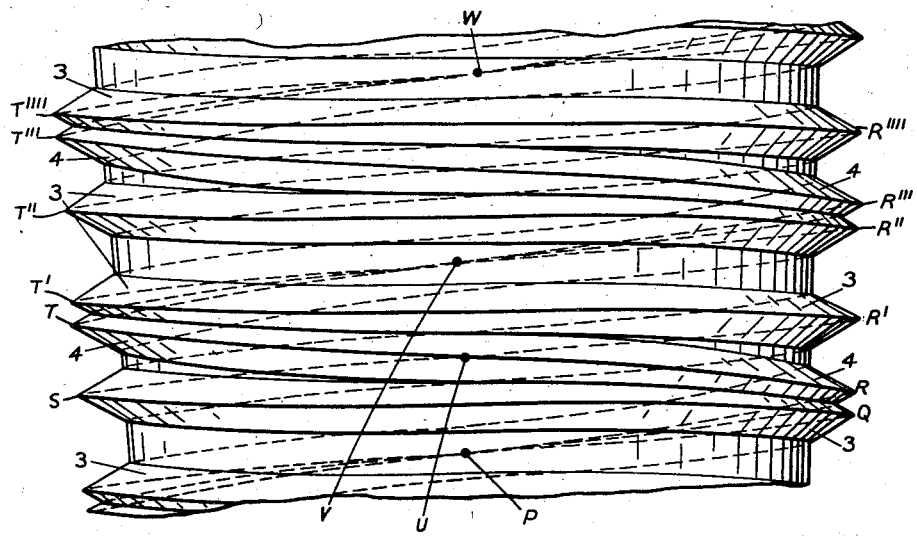

In order that the invention may be clearly understood and readily carried into effect examples will now be described with reference to the accompanying drawings, in which:

Figure 1 is a side elevation of a hypodermic syringe,

Figure 2 is an elevation, on a very greatly enlarged scale, of part of the nozzle of the hypodermic syringe, and Figure 2A is an elevational view of a portion of the threads shown in Figure 2 on an enlarged scale, and Figure 2B is an elevational view of the same portion of the threads shown in Figure 2A but taken from the opposite side, and Figures 3 and 4 are views similar to Figure 2, but on not quite such a greatly increased scale, showing diagrammatically two modifications of the arrangement in Figure 2.

The hypodermic syringe has a conical nozzle 1 which is to lie inside a mounting 2 for a hypodermic needle 2a. Referring to Figure 2, the nozzle 1 is formed with two screw threads having similar V-shaped cross-sections, but the pitch of one thread is substantially twice that of the other. The convolutions of the fine pitched thread bear the reference numeral 3 and those of coarser pitch the reference numeral 4. Referring to the lowermost convolution 3, it will be seen that the coarser thread departs from the upper flank of this convolution at the point P. As the two threads continue to the points Q and R they gradually separate and after passing behind the nozzle, as viewed in Figure 2, they reappear in that figure at S and T. Then, the coarser thread once more merges with the finer thread at V. Thus, the thread of coarser pitch constitutes a web which obliquely traverses the helical space defined by the flanks of the thread of finer pitch and, in passing between the points P and V, the thread of coarser pitch is midway between the said flanks at a point U on the remote side of the member as viewed in Figure 2.

Clearly, when the nozzle is in position in the mounting 2, any liquid finding its way to the point A, for example, is prevented from running far between the threads by the thread junction at V. Thus, from the point A, the liquid can run between the threads 4 and 3 to the space between the points R and R' (see Figures 2A and 2B). The liquid can then continue upwards (with respect to the nozzle as viewed in Figures 2 and 3) in the narrowing space between the threads 4 and 3 from the points R and R' to the points T and T' (Figures 2A and 2B) after reaching the points T and T'. The liquid cannot travel very much further as the threads 4 and 3 cross each other at V which is just beyond T and T' as viewed in Figure 2A.

Now suppose liquid finds its way to the narrow space between the threads 3 and 4 at the points Q and R; this liquid can travel further along the nozzle but cannot get beyond the point W. From the points Q and R the liquid can travel between the widening space to points R' and R''. Then the liquid may travel along the space between the two threads to the points T' and T'' and from the space between the points R''' and R'''', and then along the narrowing space between the threads to the points T''' and T'''' which are close to the point W where the threads cross and beyond which the liquid cannot travel.

The nozzle which, of course, has a central bore, not shown, is in practice very finely formed, the pitch of the finer thread being forty to sixty convolutions per inch and that of the other thread twenty to thirty convolutions per inch. The nozzle may be formed by a casting method or by pressing in a die.

The threads need not be of V-shaped cross-section but one or each of them may be of any other convenient form. For example, both threads may be of square cross-section as shown in Figure 3. Referring to that figure it will be seen that there is a fine pitch thread, the convolutions of which bear the reference numeral 6, and a thread of coarser pitch with its convolutions bearing the reference numeral 7. Referring to the lowermost convolution 6, it will be seen that the coarser thread 7 departs from the upper flank of this convolution at the point B. As the two threads continue to the points C and D they gradually separate. The fine thread 6 passes round behind the nozzle, as shown by dotted lines in Figure 3, to reappear at E. The second convolution of this fine thread passes from E to F and then behind the nozzle to G. The coarser thread 7 extends obliquely across the space between these two convolutions and after leaving the point D merges into the lower flank of the thread 6 in the vicinity of the point H behind the nozzle as viewed in Figure 3. The coarser thread 7 emerges once more from the upper flank of the finer thread in the vicinity of the point J.

The thread of coarser pitch may be replaced by other elements providing the required webs between the convolutions of finer pitch. Such an alternative is shown in Figure 4 where the screw thread 8 intersects parallel rings 5 which are at right angles to the axis of the nozzle, the thread merging into the rings at the points of intersection. These points are designated K where they appear in front of the nozzle as viewed in Figure 4 and they intersect at L behind the nozzle.

The term "hard" as employed in the specification and claims is intended to indicate that the material has no, or very little resilience, which is, of course, an inherent characteristic of the materials mentioned, namely, brass, pewter, or artificial resin (the resin being in the nature of Bakelite).

It will be appreciated that in those designs involving two screw threads it is necessary either for both threads to be right-hand threads or both to be left-hand threads.

I claim:

1. In a medical syringe, a nozzle joint comprising, in combination, a tubular member having a nozzle portion formed with a hard externally conical surface and a tubular member formed with a correspondingly tapered hard internally conical surface, one of said surfaces having formed thereon two screw threads respectively of different pitches, of the same sense and of the same height from root to crest of the thread, and the crests of the two threads being adapted to engage the other of said surfaces, said screw-like threads being co-extensive over a substantial portion of said nozzle.

2. In a medical syringe, a nozzle joint comprising, in combination, a tubular member formed with a hard externally conical surface and a tubular member formed with a hard internally conical surface, one of said surfaces having formed thereon a screw thread and a plurality of webs, each such web extending from that flank of said thread which faces one end of said nozzle joint to that flank of said thread which faces the other end of said nozzle joint and each side of said web extending outwards from the root to the crest of said thread so that the crest of said thread and the crest of each said web substantially make line contact with the other of said surfaces.

3. In a medical syringe, a nozzle joint comprising, in combination, a tubular member formed with a hard externally conical surface and a tubular member formed with a hard internally conical surface, one of said surfaces having formed thereon a series of parallel rings and a screw thread intersecting said rings, the crests of said rings and of said screw thread substantially making line contact with the other of said surfaces.

4. In a medical syringe, a nozzle joint comprising, in combination, a tubular member formed with a hard smooth internally conical surface and a tubular member, a nozzle portion formed with a hard externally conical surface from which project two helical ridges of different pitches but each of the same sense and of substantially the same V-shaped cross-section, the apices of said ridges each substantially making line contact with said internally conical surface, said helical ridges being co-extensive over a substantial portion of said nozzle.

5. A hypodermic syringe having a nozzle provided with an externally conical surface having formed thereon a screw thread and a plurality of webs, each such web extending from that flank of said thread which faces the outlet end of said nozzle to that flank of said thread which faces the inlet end of said nozzle and each side of said web extending outwards from the root to the crest of said thread, and a hypodermic needle mounting formed with a hard smooth internally conical surface making line contact with the crests of said thread and of said webs.

SAMUEL JAMES EVERETT.

REFERENCES CITED

The following references are of record in the file of this patent:

UNITED STATES PATENTS

| Number | Name | Date |
|---|---|---|
| 651,328 | Guilmette | June 5, 1900 |
| 2,263,137 | Oestereicher | Nov. 18, 1941 |
| 280,022 | Estabrook | June 26, 1883 |

FOREIGN PATENTS

| Number | Country | Date |
|---|---|---|
| 57,604 | Switzerland | Oct. 12, 1911 |
| 574,612 | France | Apr. 3, 1924 |
| 574,948 | France | Apr. 9, 1924 |
| 505,212 | Great Britain | May 8, 1939 |